United States Patent [19]

Schulze

[11] Patent Number: 4,835,644
[45] Date of Patent: May 30, 1989

[54] SIDE LOADED DISK DRIVE PIVOT

[75] Inventor: Dieter M. Schulze, Saratoga, Calif.

[73] Assignee: Microscience International Corporation, Sunnyvale, Calif.

[21] Appl. No.: 51,990

[22] Filed: May 19, 1987

[51] Int. Cl.⁴ .......................... G11B 5/55; G11B 21/08
[52] U.S. Cl. .................................................. 360/106
[58] Field of Search ............... 360/104, 106, 107, 97, 360/99; 384/494, 495, 517–519, 612

[56] References Cited

U.S. PATENT DOCUMENTS

| | | | |
|---|---|---|---|
| 3,333,753 | 8/1967 | Streets | 360/107 X |
| 3,482,060 | 12/1969 | Dermond | 360/105 X |
| 4,099,212 | 7/1978 | Dolby | 360/109 |
| 4,156,261 | 5/1979 | Wolf | 360/109 |
| 4,490,635 | 12/1984 | Harrison et al. | 360/106 X |
| 4,510,543 | 4/1985 | Ohta et al. | 360/106 |
| 4,655,616 | 4/1987 | Ducan | 384/495 X |
| 4,682,255 | 7/1987 | Sleger et al. | 360/106 |

FOREIGN PATENT DOCUMENTS 0094275  5/1984  Japan .................................. 360/106
0182067  9/1985  Japan .................................. 360/106

Primary Examiner—Stuart N. Hecker
Assistant Examiner—David J. Severin
Attorney, Agent, or Firm—Townsend and Townsend

[57] ABSTRACT

A mechanism for applying a side-loading force to a ball bearing ring of a hard disc drive pivoting head arm assembly. The head arm assembly has a central shaft with first and second ball bearing rings surrounding the shaft, one ring being above the other. One or more springs bias the upper and lower rings away from each other to apply a vertical loading force. A side loading force is applied to one of the ball bearing rings to further stabilize the head arm assembly. The addition of the side loading force of the present invention gives loading forces in two directions on the ball bearings of the head arm assembly, thus greatly increasing the stability. Not only vertical vibrations are prevented, but also side-to-side or tilting vibrations are prevented as well. The side loading is preferably done with a spring mounted in a recess in the cylinder surrounding the ball bearing rings.

6 Claims, 2 Drawing Sheets

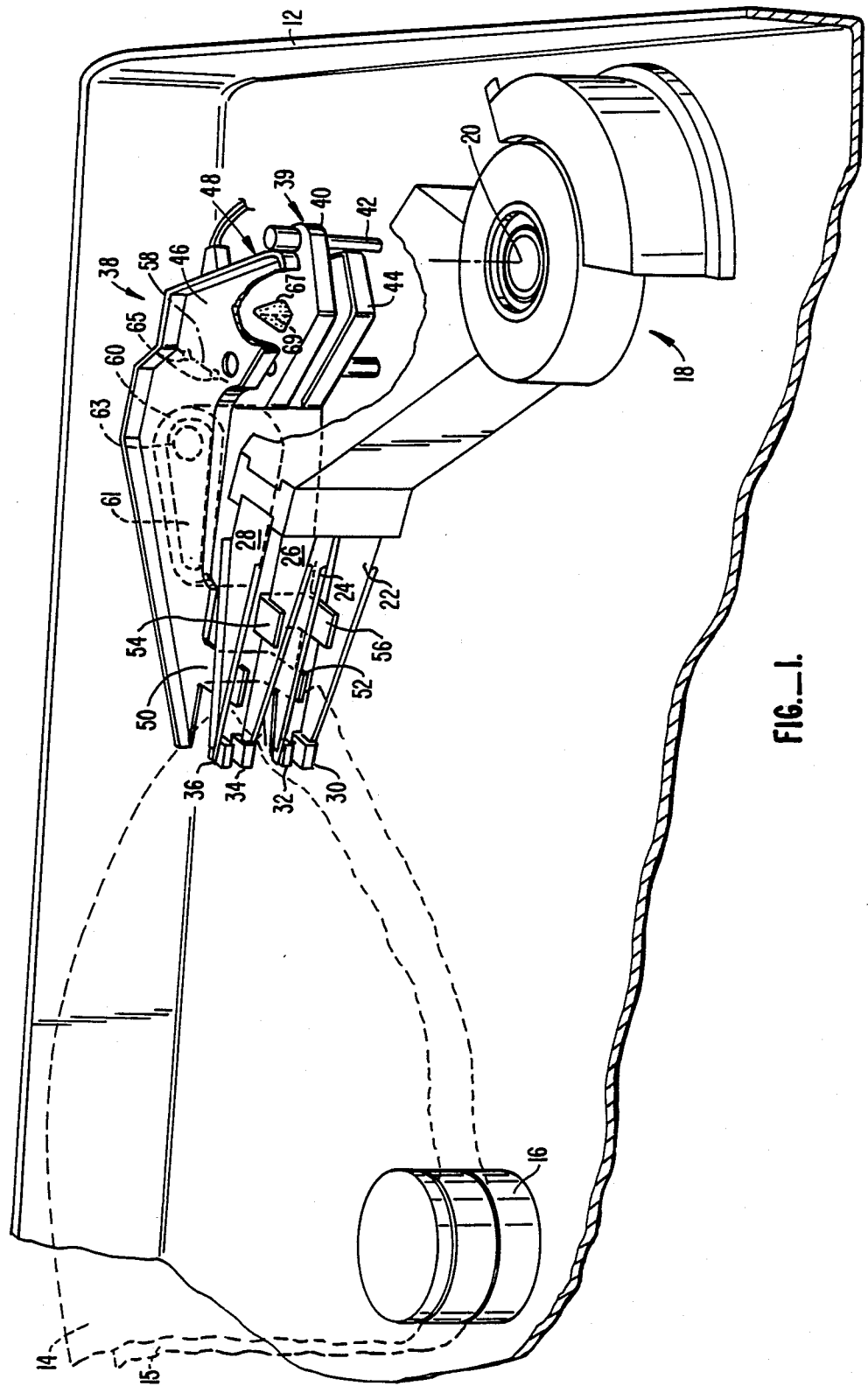
FIG._1.

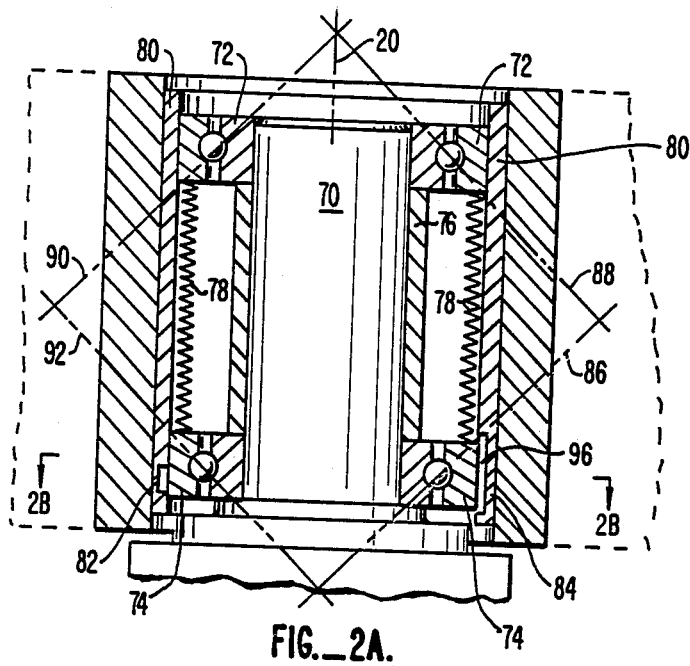
FIG._2A.
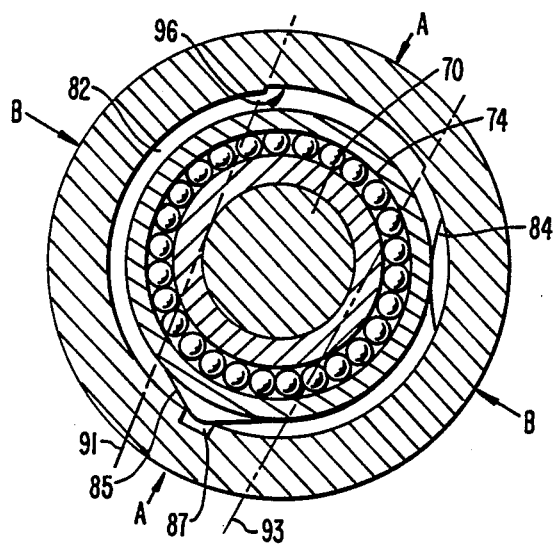
FIG._2B.

SIDE LOADED DISK DRIVE PIVOT

BACKGROUND

The present invention relates to hard disk drive pivoting head arm assemblies.

In a hard disk drive, one or more disks are mounted on a spindle for rotation. Heads for reading and writing data onto the disks are mounted on the end of a head arm which swings across the surface of the disk. In a typical arrangement, the head arm is mounted to rotate about a pivot axis so that the heads will swing across the surface of the disk in an arcuate path.

Such a pivot axis runs through the middle of a central shaft which is surrounded by a pair of ball bearing rings. A cylinder coupled to the head arm is mounted around the ball bearing rings for rotation. Also connected to the cylinder opposite the head arms is an actuator coil which passes between some permanent magnets. By applying the proper current to the coil, the magnetic fields generated by the coil and the permanent magnets interact, causing the head arm assembly to rotate.

Because the heads ride very close to the surface of the disks, it is important that the head arm assembly not vibrate or tilt and damage the disk. A tilt would also cause mistranslation between the position sensing servo head and the data heads which are referenced to the servo heads for position. A vertical biasing spring is typically inserted between the two ball bearings to exert a vertical loading force on the ball bearings, thus preventing up and down movement or vibration which could damage the disks or impair the effectiveness of the heads.

SUMMARY OF THE INVENTION

The present invention is directed to a mechanism for applying a side-loading force to a ball bearing ring of a hard disk drive pivoting head arm assembly. The head arm assembly has a central shaft with first and second ball bearing rings surrounding the shaft, one ring being above the other. One or more springs bias the upper and lower rings away from each other to apply a vertical loading force. A side loading force is applied to one of the ball bearing rings to further stabilize the head arm assembly.

The addition of the side loading force of the present invention gives loading forces in two directions on the ball bearings of the head arm assembly, thus greatly increasing the stability. Not only vertical vibrations are prevented, but also side-to-side or tilting vibrations are prevented as well.

The side loading force is applied to one of the two outer ball bearing rings. This is done with a spring which is mounted in a recess in a cylinder surrounding the ball bearing ring. The width of the leaf spring is less than the width of the ball bearing ring so that the ring will still contact the inside of the cylinder opposite the leaf spring. The force applied by the leaf ring is less than the vertical loading force so that it does not bypass the vertical loading of the two ball bearing rings.

For a further understanding of the nature and advantages of the invention, reference should be made to the ensuing detailed description taken in conjunction with the accompanying drawings.

BRIEF DESCRIPTION OF THE DRAWINGS

FIG. 1 is a perspective view, partially broken away, of a disk drive having a rotatable head arm assembly;

FIGS. 2A and 2B are vertical and horizontal sectional views of a portion of the head arm assembly of FIG. 1 showing side-loading according to the present invention.

DETAILED DESCRIPTION OF THE PREFERRED EMBODIMENTS

FIG. 1 shows a disk drive assembly having a housing 12 and a pair of disks 14, 15 (shown in phantom) mounted on a spindle 16. A head arm assembly 18 rotates about a pivot axis 20 to swing head arm members 22, 24, 26 and 28 about axis 20, thereby moving heads 30, 32, 34 and 36 into and out of the stack of disks 14, 15.

A head lifter assembly 38 serves to lift the heads away from the disks when the disk drive is not in operation.

FIG. 2A is a vertical sectional view through the center portion of head arm assembly 18. Pivot axis 20 extends through the center of a central shaft 70. Shaft 70 is surrounded by an upper ball bearing ring 72 and a lower ball bearing ring 74. The inside portions of ball bearing rings 72 and 74 are optionally vertically separated by a cylinder 76. The outside portion of ball bearing rings 72 and 74 are separated by biasing spring 78. Ball bearing rings 72 and 74 are surrounded by an outer cylinder 80.

Cylinder 80 is provided with a recess 82 extending around the inside circumference of the cylinder. A spring 84 (such as a leaf spring) is placed in recess 82 to provide a side loading force against ball bearing ring 74.

Spring 84 can be better seen in the horizontal section of FIG. 2B taken along lines 2B of FIG. 2A. As can be seen, a mid-portion of spring 84 is pressed against the outer portion of ball bearing ring 74, with the two ends of leaf spring 84 being wedged against the inside walls of recess 82. Alternately, a spring 85 as shown in FIG. 2B could be used. Spring 85 has two contact points on ball bearing ring 74 along lines 91, 93. The mid-portion of leaf spring 85 is wedged in a hole 87 to prevent relative movement of the spring. Because spring 85 has two contact points, tilting is prevented both along lines A—A and lines B—B of FIG. 2B.

The force exerted on the ball bearings by the combination of springs 78 and spring 84 is shown by force lines 86, 88, 90 and 92 of FIG. 2A and force lines 91 and 93 of FIG. 2B for leaf spring 85. The point at which these lines intersect the surface of the ball bearings of ball bearing rings 72 and 74 are the points at which these ball bearings are in contact with the inner and outer ring halves of ball bearing rings 72 and 74. A recess 96 is provided in cylinder 80 to provide two contact points opposite the spring to increase stability. Recess 96 is wider than bearing ring 74 as shown in FIG. 2A. In operation, the springs will push ball bearing ring 74 into contact with the edges of recess 96. A separation is shown in FIGS. 2A and 2B for clarity. The force pattern thus generated is very stable and will prevent not only vertical but horizontal vibrations.

The force of spring 84 must be less than that of spring 78 so that the vertical loading is not bypassed. In addition, the force exerted by spring 84 must be sufficiently large so that it cannot be overcome by the G-forces of the head arm assembly during rotation.

As will be understood by those of skill in the art, the present invention can be embodied in other specific forms without departing from the spirit or essential characteristics thereof. For example, the spring can take on a number of different shapes, such as having its mid-portion contact the cylinder 80 wall of recess 84 and a portion proximate each of its ends contact ball bearing ring 74. Accordingly, the foregoing description of the preferred embodiments is intended to be illustrative, but not limiting, of the scope of the invention which is set forth in the following claims.

What is claimed is:

1. In a disk drive pivoting head arm assembly having a central shaft, upper and lower ball bearing rings connected to and surrounding said shaft and means for applying a vertical loading force to said ball bearing rings, the improvement comprising:
   a rotatable cylinder connected to and surrounding said ball bearing rings, said cylinder defining a first circular recess next to one of said ball bearing rings; and
   a spring having first and second ends extending into said first recess and a mid-portion in contact with one of said one ball bearing ring and said rotatable cylinder, said spring having sufficient stiffness to exert a side loading force on said one ball bearing ring less than a vertical loading force exerted on said one ball bearing ring by said means for applying a vertical loading force;
   said rotatable cylinder also defining a second recess opposite said spring, said second recess being wider than said one ball bearing ring so that said ring is forced into said second recess to provide contact between said ring and said cylinder at two points at the edges of said second recess.

2. The improvement of claim 1 wherein said spring has first and second ends extending into said first recess and a mid-portion contacting said one ball bearing ring.

3. The improvement of claim 1 wherein said spring has a width less than a width of said one ball bearing ring.

4. The improvement of claim 1 wherein said spring provides said loading force to a lower one of said ball bearing rings.

5. The improvement of claim 1 wherein said spring has points proximate first and second ends of said spring in contact with said one ball bearing ring.

6. The improvement of claim 1 further comprising a third recess within said first recess in said cylinder for retaining a center portion of said spring to prevent relative movement in a circumferential direction.

* * * * *